United States Patent Office 3,740,329
Patented June 19, 1973

---

3,740,329
DISPERSION REMOVAL BY LIQUID MEMBRANE PROCESS
Norman N. Li, Edison, N.J., assignor to Esso Research and Engineering Company, Linden, N.J.
No Drawing. Filed Feb. 25, 1971, Ser. No. 119,005
Int. Cl. B01d 11/00
U.S. Cl. 210—21
10 Claims

ABSTRACT OF THE DISCLOSURE

This invention relates to a method for removing a dispersed phase from an external phase by contacting said dispersed phase with surfactant membrane coated droplets, said surfactant membrane coated droplets comprising an interior phase coated with a surfactant membrane, whereby said dispersed phase interacts with the surfactant membrane, and removing said dispersed phase along with the surfactant membrane coated droplets. Preferably, the dispersed phase is either solid or liquid and the external phase is liquid. The surfactant membrane coated droplets are contacted with the dispersed phase by mixing the external phase with an emulsion comprising said surfactant membrane droplets dispersed in a continuous phase, said continuous phase being either miscible or immiscible with the external phase. This method is especially useful for removing suspended oil, clay, rust and other contaminants from waste water.

BACKGROUND OF THE INVENTION

Field of the invention

This invention relates to a method for removing a dispersed phase from an external phase by contacting said dispersed phase with surfactant membrane coated droplets, said surfactant membrane coated droplets comprising an interior phase coated with a surfactant membrane, whereby said dispersed phase interacts with the surfactant membrane, and removing said dispersed phase along with the surfactant membrane coated droplets. Preferably, the dispersed phase is either solid or liquid and the external phase is liquid. The surfactant membrane coated droplets are contacted with the dispersed phase by mixing the external phase with an emulsion comprising said surfactant membrane droplets dispersed in a continuous phase, said continuous phase being either miscible or immiscible with the external phase. This method is especially useful for removing suspended oil, clay, rust and other contaminants from waste water.

Prior art

The need to remove suspended matter from various liquids is present in many diverse industries. In the papermaking industry, paper fines are difficult to separate from the waste water, which necessarily results from a papermaking process. Before this waste water can be returned to its public source, the fines must be removed. This can be done by adding polyvalent metal ions to destroy the electrical charges present on the fines which makes them mutually repellent and thus form stable suspensions. Of course, the polyvalent metal ions then become a source of impurities themselves, requiring the water to be treated further before returning to public sources. Recent developments rely on the use of various electrically charged polymers which are more efficient for removal of suspended fines and also remain with the fines, thus allowing the water to be sent directly back to its public source without further treatment. The various polymers used in this process are expensive and difficult to work with in that they require tedious mixing to obtain proper dilution prior to adding them to the suspended paper fines waste water.

Another area where it is important to remove suspended matter from a liquid is sewage treating. In this area, the sewage after chemical treatment is pumped into settling ponds and allowed to stand until the particulate matter settles out. This requires that large areas of land be dedicated to these settling ponds. Electrically charged polymers are also available to increase settling rate but suffer from the same disadvantages as those used in the removal of paper fines from paper mill waste water.

It is also possible to filter liquids to remove suspended matter. Typical problems in filtration include the fact that some suspended particles will pass through the filter with the liquids while others may form cakes on the filter which effectively decrease the filtration rate. In the petroleum processing industry suspended oils must be removed from petroleum process waste water. The usual procedure is to pump this waste water containing suspended oils into a settling pond where the heavy oil is skimmed from the surface. This oil because of various impurities can form emulsions, thus making a skimming technique difficult if not impossible.

SUMMARY OF THE INVENTION

It has now been discovered that a dispersed phase can be removed from an external phase by contacting said dispersed phase with surfactant membrane coated droplets, said surfactant membrane coated droplets comprising an interior phase coated with a surfactant membrane. In the process of this invention the dispersed phase interacts with the surfactant membrane and is removed from said external phase by the removal of the surfactant membrane coated droplets. This is a general procedure which can be applied in various diverse areas. The external phase is usually a liquid, although it can also be a gas. The dispersed phase may be a liquid which is nonmiscible with the external phase, a gas or a solid. Various dispersed phase-external phase systems which may be treated by the process of this invention include industrial and municipal waste water streams. All of these streams may contain clay, oil, rust and algae as the dispersed phase. Industrial product streams which contain suspended matter may also be treated by the process of this invention. Specific streams of interest include municipal sewage wastes, petroleum processing waste water, waste water obtained by washing the compartments in various cargo ships and oil tankers, waste water obtained by cleaning various boilers and other heating units, waste water obtained by scrubbing various vapor streams to remove both suspended liquids and solids, etc. Usually the external phase will be a liquid, but various gases which contain suspended liquids and solids may also be treated by the process of this invention. Specific examples of these would be the gas streams resulting from various combustion processes which will contain suspended carbon, water vapor, sulfuric acid, etc.

In each case the surfactant membrane coated droplets will be chosen according to the nature of the dispersed phase. The liquid surfactant membrane coated droplets are formed by coating droplets of an interior phase with a surfactant membrane. This can be done by many techniques known in the art. For example, see "Emulsions—Theory and Practice" by P. Becker, Reinhold, New York, 1965. Surfactant coated droplets may be produced having diameters as small as 0.1 micron, thus providing large surface areas for interaction with the dispersed phase. The process of the instant invention is thus able to function more efficiently than prior processes such as filtration, wherein the surface area available for interaction with the dispersed phase, e.g., the filter-external phase interface, is much smaller.

The interior phase will be chosen so that it is easily separable from the external phase due to the difference in specific gravity; that is, where the external phase is aqueous having a specific gravity of approximately 1.0, the interior phase may be either a hydrocarbon, for example normal hexane which has a specific gravity of 0.66, or a chlorinated hydrocarbon, for example carbon tetrachloride which has a specific gravity of 1.4. In the case of the hexane interior phase the surfactant membrane coated droplets will be lighter than the aqueous external phase, and thus the droplets will tend to rise up when contacted with the external phase. The dispersed phase, now attached to the droplets, will be separated at the top of the system. With the carbon tetrachloride interior phase the droplets will tend to sink and can be removed at the bottom of the column of the external phase. An interesting procedure is outlined in U.S. application 818,336, filed on Apr. 22, 1969, now Patent No. 3,365,091, in the name of N. N. Li, wherein gas bubbles are introduced into the interior phase of a surfactant membrane coated droplet in order to cause the droplet to rise in a system in which the interior phase has a specific gravity approximately equal to the external phase. This technique can also be used in the process of the instant invention. Specific compounds which can be used as the interior phase include both aqueous and nonaqueous liquids, for example water, hydrocarbons, chlorinated hydrocarbons, alcohols, ethers, organic acids, etc. The only requirement being that the interior phase be able to be formed into droplets and be coated by a surfactant membrane. It is, of course, critical that the interior phase not interact with the surfactant membrane to weaken it and cause subsequent rupturing of the droplets. In the process of this invention the surfactant membrane coated droplets must maintain their integrity in order to act as a separate phase for interaction with the dispersed phase.

It is to be noted that the interior phase will usually be a liquid but, as outline above, may be partially replaced with a gas or in extreme situations can be totally replaced with a gas.

The surfactant membrane coated droplets also comprise a surfactant membrane coating. This coating comprises one or more surfactants which are chosen according to their ability to form a stable surfactant membrane around the droplet of the interior phase, various additives and, when required, a solvent for all of these compounds. Since the surfactant membrane coated droplets of the system must not rupture, it is important that the surfactant forms a strong membrane.

Various membrane strengthening additives can be added to the surfactant in order to insure against rupture. Examples of these compounds are illustrated in U.S. Patent application No. 66,549, filed Aug. 24, 1970, now Pat. No. 3,696,028, hereby incorporated by reference, which is directed toward an invention comprising the use of membrane strengthening additives to an improved liquid surfactant membrane separation process. These same membrane strengthening additives can be used in the process of the instant invention. Other additives may be used to enhance the adsorption or absorption capabilities of the membranes.

The surfactant of this invention is chosen so that it will interact with the dispersed phase and thus remove it from the external phase. One surfactant which has been found particularly useful, both because it forms a very strong surfactant membrane and is useful in removing the various dispersed phases, is saponin. This surfactant is anionic and described in Hackh's Chemical Dictionary as a glucoside from soapwort, quillaia, and other plants. Because of its anionic nature, it is very useful for separating particles cationic in nature, such as sodium ion solvated by water molecules. This surfactant is used when an aqueous continuous phase is desired. When the continuous phase is a hydrocarbon, Span 80, a sorbitan fatty acid ester, may be used.

Surfactants useful in the process of this invention include anionic, cationic and nonionic surfactants. Anionic surfactants include soaps, sulfonates, sulfate esters, etc. Cationic surfactants include amine salts as well as quaternary ammonium compounds. Typical nonionic surfactants include alkyl, phenol-ethoxylates, ethoxylated fatty alcohols, etc. Surfactants useful in the process of this invention are given in "Surface Active Agents and Detergents," Schwartz, Perry and Berch, Interscience Publishers Inc., New York, 1958.

The surfactant membrane may also contain various other compounds to promote interaction with the dispersed phase. For example, acids and bases can be utilized as the additives where the nature of the dispersed phase requires such, e.g., acidic liquid membranes may be used to adsorb basic particles and vice versa.

Usually the dispersed phase will be adsorbed at the surface of the surfactant memberane. It is also possible that the dispersed phase can be absorbed by the membrane and permeate into the interior phase. It is critical only that the dispersed phase interact with the surfactant membrane coated droplets in some way so that when the surfactant coated droplets are removed from the external phase the dispersed phase will be removed also. Thus, both adsorption and absorption are within the scope of the instant invention.

The surfactant membrane coated droplets can be contacted with the dispersed phase in various ways. The surfactant membrane coated droplets can be formed by making an emulsion which will comprise droplets of an interior phase coated by a surfactant membrane. Said surfactant membrane coated droplets will be suspended in a continuous phase, which may be either miscible or immiscible with the external phase from which it is desired to separate out a dispersed phase. The emulsion thus formed is added directly to the external phase and the mixture stirred. The ratio, by volume, of emulsion to external phase may vary from 1/1000 to 100, preferably from 1/100 to 1. After a specific time period the stirring is ceased and the liquid surfactant membrane coated droplets will either rise to the top of the external phase or settle to the bottom where it can be easily separated. Of course, the dispersed phase should be separated with the surfactant membrane coated droplet. Where the continuous phase is miscible with the external phase the emulsion can be mixed directly with the external phase. Where the continuous phase is immiscible with the external phase the emulsion is introduced as droplets. In this case the continuous phase also plays a part in the interaction with the dispersed phase. The dispersed phase will either be absorbed by the continuous phase or adsorbed at the continuous phase-external phase interface.

The emulsion may be either of the oil-in-water or the water-in-oil type. Specific surfactants will be chosen according to their ability to form stable emulsions of the interior phase in the continuous phase. The surfactant will comprise at least 0.001% by weight of the emulsion, preferably from 1.0 to 90%. For economic reasons, the surfactant will usually comprise from about 0.1 to 5% by weight of the emulsion. Membrane strengthening additives, e.g. glycerol, may comprise from about 1 to 70% by weight of the emulsion, preferably from 10 to 50%. The weight ratio of the interior phase to the continuous phase may vary from 1/10 to 10, preefrably from 1/3 to 3.

In another procedure the surfactant membrane coated droplets can be formed in situ in the external phase. For example, a surfactant and an interior phase which may be miscible or immiscible with the external phase are mixed with the external phase until an emulsion is formed. Said mixing is stopped and allowed to stand until the emulsion rises either to the top or settles to the bottom of the external phase. The dispersed phase, of course, remains with the emulsion and is separated therefrom. In this procedure preferably the interior phase will be immiscible with the external phase.

The process of the instant invention has been described as a batch process. It is also possible to carry out the above process continuously with the liquid surfactant membrane coated droplets being introduced either countercurrently or concurrently with the external phase and the separated external phase being removed therefrom.

A typical example of the process of the instant invention is as follows. To 100 milliliters of a suspension of calcium hydroxide in water (1 gram calcium hydroxide per 100 milliliters of water) are added 10 grams of an emulsion of 6 grams of normal hexane in 4 grams of a 0.2% saponin, 70% glycerol, and 29.8% water solution. In this system the saponin is the surfactant, the normal hexane is the interior phase, and the continuous phase of the emulsion is glycerol-water. The resultant mixture is stirred for 0.2 minute at 50 r.p.m. and then allowed to settle. The emulsion rises and is thus easily separated. The remaining water is clear and ready for recycling.

The above process may be carried out at any temperature above which the external phase, when the external phase is immiscible with the continuous phase, or the external phase-continuous phase mixture, when the phases are miscible, is fluid. For convenience, the process is usually carried out at ambient temperature, i.e., 15 to 30° C. It is, of course, critical that the surfactant membrane coated droplets must be stable at the process operating temperature chosen.

The pressure at which the instant process is run is chosen according to the same criteria as the temperature. Any pressure at which the external phase or the external phase-continuous phase mixture is fluid may be used. Usually, for convenience, ambient pressure, i.e., 1 atmosphere, is chosen.

The following are specific embodiments of the instant invention.

EXAMPLE 1

Removal of suspended crude oil from separator effluent 500 g. of effluent from a petroleum processing separator, which is used to separate oil from petroleum processing waste water and which contained 86 p.p.m. of a heavy crude oil suspended in an aqueous phase, was mixed with 50 g. of an emulsion which comprised a 3% by weight sodium chloride in water-solution as the interior phase and a continuous phase comprising 2% by weight Span 80, 18% by weight ENJ3029, which is an amine with a molecular weight of about 2,000, and 80% S100N, which is a paraffinic solvent. The weight ratio of the interior phase to the continuous phase was 1 to 2. The mixture was stirred for 40 minutes and allowed to settle. The emulsion rose to the top taking the suspended hydrocarbons with it and was easily separated. The separator effluent which was now at the bottom was crystal-clear. Infrared analysis showed that the separator effluent contained only 4 p.p.m. of suspended crude oil. The separator effluent was now of sufficient quality to reuse.

EXAMPLE 2

Removal of suspended crude oil from separator effluent

The above procedure was repeated except that the effluent contained 243 p.p.m. of suspended heavy crude oil. The mixture was stirred for 20 minutes at 100 r.p.m. and when the stirring was discontinued and the mixture allowed to settle for 5 minutes the aqueous effluent phase was found to contain only 73 p.pm. of suspended heavy crude oil. This treated effluent can be recycled to a second stage which may be substantially the same as the first stage for further reduction of suspended oil.

EXAMPLE 3

Treatment of waste water containing a solid dispersed phase 500 g. of an aqueous phase which contained 2% by weight of finely dispersed clay and iron rust (50/50 mixture) was mixed with 50 g. of an emulsion having hexane as the interior phase and a solution comprising 0.2% by weight saponin, 70% by weight glycerol and 29.8% by weight water as the continuous phase. The weight ratio of the interior phase to the continuous phase was 1 to 1. The mixture was stirred at 50 r.p.m. for 0.2 of a minute. When the stirring was terminated the aqueous phase was clear with all suspended matter in the emulsion phase.

EXAMPLE 4

Removal of a high molecular weight insoluble polymer from an aqueous external phase 500 g. of a 20% by weight starch-in-water mixture were stirred at 50 r.p.m. for 0.5 minute with a 50 g. emulsion comprising S100N (a paraffinic solvent) as the interior phase and a solution comprising 0.2% by weight saponin, 70% by weight glycerol, 0.5% by weight HCl and 29.3% by weight water with a weight ratio of the interior phase to the continuous phase being 1:1. The starch was concentrated in the emulsion phase and the water phase was clear.

EXAMPLE 5

Treating a nonaqueous external phase 500 g. of a 1% by weight ferric sulfate suspension in a paraffin oil were mixed with 50 g. of the emulsion described in Example 4. The mixture was stirred for 15 minutes at 100 r.p.m. and allowed to settle after termination of the stirring for 5 minutes. The emulsion settled to the bottom carrying the ferric sulfate with it and leaving behind a sparkling clear oil phase. This example shows that nonaqueous external phases can be treated within the process of this invention.

EXAMPLE 6

Treating a nonaqueous external phase 500 g. of a 1% stearic acid suspension in $C_7$ aromatics were treated with 50 g. of the emulsion of Example 4. After stirring for 15 minutes at 100 r.p.m. and allowing settling for 5 minutes, the emulsion settled to the bottom carrying the stearic acid with it. The $C_7$ aromatic external phase was sparkling clear.

EXAMPLE 7

Treatment of an aerosol 100 cubic feet per minute of an air stream which contained 0.1% $H_2SO_4$ is sparged through 20 cc. of an emulsion which comprises hexane as the interior phase and 0.2% by weight saponin, 50% by weight glycerol, 1.8% by weight sodium hydroxide and 48% by weight water as the continuous phase. The ratio by weight of the interior phase to the continuous phase is 1:1. The amount of $H_2SO_4$ present in the exiting air stream is reduced.

This process is an improvement over a conventional scrubbing process which utilizes a caustic aqueous phase to remove sulfuric acid in that the surfactant coated droplets are available to break up large air bubbles and thus provide increased contacting of the sulfuric acid with sodium hydroxide. The concentration of sodium hydroxide in the membrane can be changed according to the need.

EXAMPLE 8

Removal of a dispersed benzene in an air stream

The experiment of Example 7 was repeated utilizing a 0.1% benzene-in-air mixture in place of the 0.1% sulfuric acid-in-air mixture of said example and an emulsion comprising water as the interior phase and 0.2% Span 80, 2.8% ENJ3029 and 97% S100N as the continuous phase in place of the emulsion of Example 7. The ratio by weight of the interior phase to the continuous phase is 1:1. The results are substantially the same in that the benzene present in the exit stream is reduced.

EXAMPLE 9

Removal of dust from an air stream

The experiment of Example 7 was repeated utilizing an air stream containing 0.1% of suspended particles of clay in place of the air stream of Example 7. This air stream is representative of those found in the cement processing industries wherein the suspended solid particles are removed by electrostatic precipitators. The results of this experiment are substantially equivalent to Example 7 in that the suspended solids in the exit stream are reduced.

All of the above examples were run at ambient condition, i.e., 20° C. and 1 atmosphere.

What is claimed is:

1. A method for removing a dispersed oil from an aqueous phase which comprises contacting said aqueous phase with an emulsion comprising surfactant membrane coated droplets dispersed in a continuous phase, said continuous phase being immiscible with said aqueous phase, whereby said suspended oil interacts with said surfactant membrane coated droplets, and removing said oil along with said surfactant membrane coated droplets.

2. The method of claim 1 wherein said aqueous phase is contacted with said emulsion by mixing from 0.1 to 1 part by volume emulsion to 1 part by volume aqueous phase.

3. The method of claim 2 wherein said emulsion comprises from about 0.1 to 5% by weight surfactant.

4. The method of claim 3 wherein said surfactant is a sorbitan fatty acid ester.

5. The method of claim 4 wherein said emulsion comprises salt water as an interior phase and an isoparaffin as a continuous phase.

6. A method for removing a dispersed solid from an aqueous phase which comprises contacting said aqueous phase with an emulsion comprising surfactant membrane coated droplets, dispersed in a continuous phase, said continuous phase being immiscible with said aqueous phase, whereby said dispersed solid interacts with said surfactant membrane coated droplets, and removing said dispersed solid along with said surfactant membrane coated droplets.

7. The method of claim 6 wherein said dispersed phase is clay.

8. The method of claim 6 wherein said dispersed phase is rust.

9. The method of claim 6 wherein said aqueous phase is contacted with said emulsion by mixing from 0.1 to 1 part by volume emulsion to 1 part by volume aqueous phase.

10. The method of claim 6 wherein said emulsion comprises from about 0.1 to 5% by weight surfactant.

References Cited

UNITED STATES PATENTS

| | | | |
|---|---|---|---|
| 2,903,423 | 9/1959 | Mundria et al. | 210—21 |
| 3,349,029 | 10/1967 | Cheng | 210—21 |
| 2,037,218 | 4/1936 | Empson | 210—21 |
| 2,761,563 | 9/1956 | Waterman et al. | 210—21 |
| 3,566,580 | 3/1971 | Li | 55—16 |
| 3,410,794 | 11/1968 | Li | 210—21 X |
| 3,637,488 | 1/1972 | Li et al. | 210—22 |
| 3,617,546 | 11/1971 | Li et al. | 210—22 X |

FRANK A. SPEAR, Jr., Primary Examiner